Dec. 29, 1931.   H. C. EDDY   1,838,910
METHOD OF AND APPARATUS FOR DEHYDRATING PETROLEUM OIL
Original Filed Aug. 9, 1926
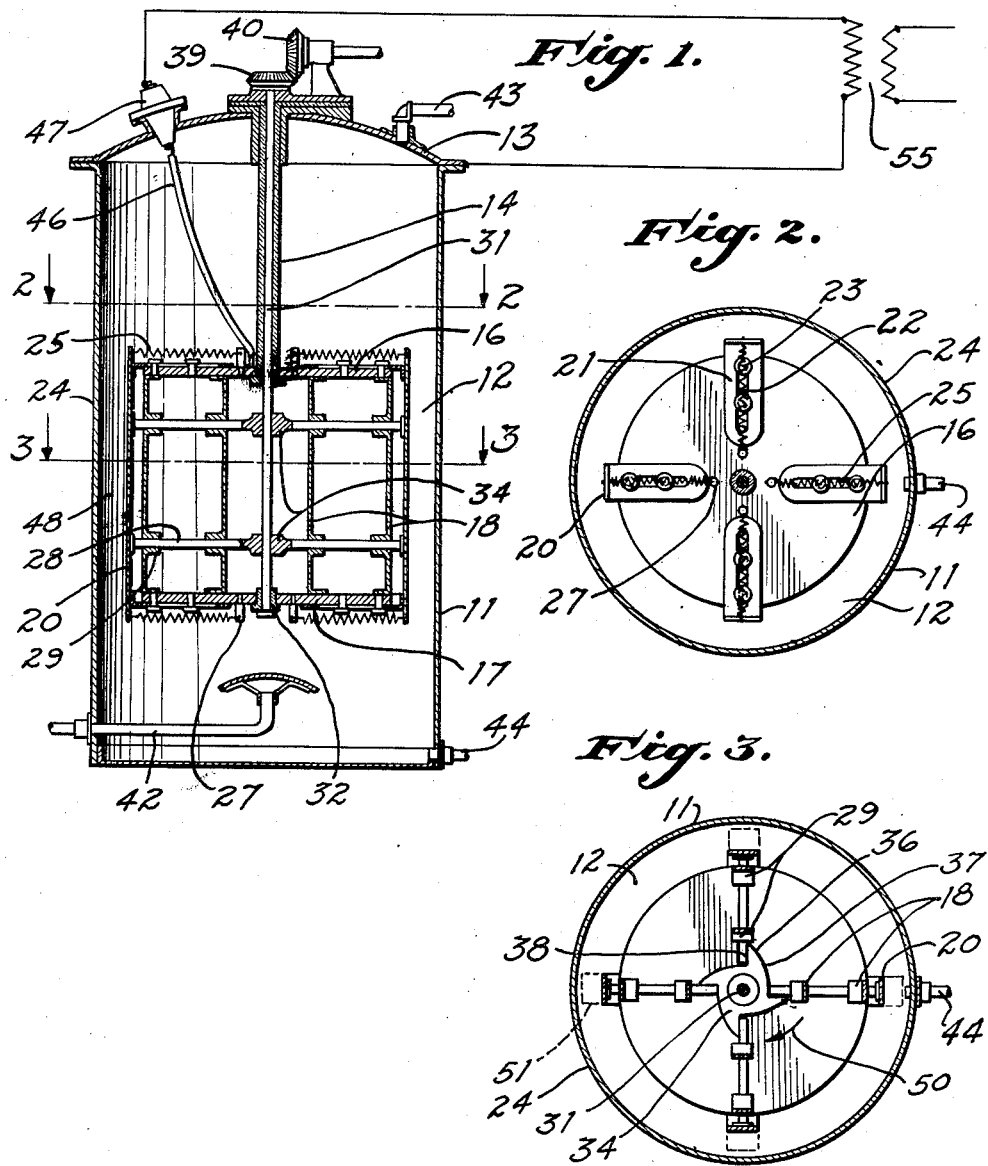
INVENTOR:
HAROLD C. EDDY,
BY
ATTORNEY.

Patented Dec. 29, 1931

1,838,910

UNITED STATES PATENT OFFICE

HAROLD C. EDDY, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

METHOD OF AND APPARATUS FOR DEHYDRATING PETROLEUM OIL

Application filed August 9, 1926, Serial No. 128,294. Renewed October 1, 1929.

My invention relates to electrical dehydration and particularly to an electrical dehydrator which is particularly adapted for removing water from emulsified petroleum oil. In the oil producing industry petroleum oil which is derived from the well carries particles of trapped water which must be separated therefrom before the oil is commercially useful. The dehydration of petroleum oil is usually accomplished by passing the oil through an electrical dehydrator having a pair of electrodes of opposite polarity therein. These electrodes are included in an electrical circuit and a high potential electric field is established therebetween. The electric field agglomerates the particles of water into globules which have sufficient weight to cause them to separate by gravity from the oil.

There is a strong tendency for the globules of water to form into short-circuiting chains between the electrodes, thus forming conductor paths through which the electric current may pass. This forming of short-circuiting chains causes a heavy current to be drawn by the dehydrator so that it is expensive to operate and also greatly reduces the efficiency of the dehydrator. It therefore logically follows that in order to maintain efficiency and economy, the short-circuiting chains of globules of water must be broken as they are formed. It has been demonstrated that these short-circuiting chains may be broken by disturbing the position of one of the electrodes.

It is an object of this invention to provide a dehydrator in which one of the electrodes is suddenly disturbed in order to break the short-circuiting chains.

By close observation it is possible to accurately determine the amount of time it takes for the short-circuiting chains to form. In order to maintain the dehydrator at a high degree of efficiency, the short-circuiting chains should be broken immediately upon their formation.

It is accordingly one of the objects of this invention to provide a dehydrator in which one of the electrodes may be automatically disturbed at intervals which coincide with the time required for the short-circuiting chains to form.

A still further object of the invention is to provide a dehydrator having a novel form of cam mechanism for disturbing the position of one of the electrodes.

Another object of the invention is to provide a novel method of and apparatus for electrically treating a fluid, and especially a petroleum emulsion, by slowly building up the voltage per unit of distance across the treating space and suddenly lowering this voltage per unit of distance. Such a slow building up of the voltage gradient followed by a quick lowering thereof produces a very desirable action in preventing short-circuiting of the electrodes.

Other objects and advantages of this invention will be made evident hereinafter.

Referring to the drawings in which I illustrate a preferred form of the invention, Fig. 1 is a vertical section through a dehydrator embodying the features of the invention.

Fig. 2 is a section taken on the line 2—2 of Fig. 1.

Fig. 3 is a section taken on the line 3—3 of Fig. 1.

The form of the invention shown in the drawings has a tank 11 which provides a dehydrating chamber 12. Extending downward from a top 13 of the tank 11 is a tubular support 14, at the lower end of which an upper cylindrical head 16 is secured. Positioned directly below the upper head 16 is a lower head 17 which is of the same size and shape as the upper head 16. The lower head 17 is supported from the upper head 16 by means of vertical tie bars 18 which are attached to both the upper and lower heads in any suitable manner. The upper and lower heads 16 and 17 and the tie bars 18 provide a supporting structure of the invention.

Surrounding the supporting structure is a plurality of vertically extending live electrodes 20 which are placed in circular arrangement as illustrated best in Figs. 2 and 3. Attached to the live electrodes 20 near the opposite ends thereof are slide plates 21 which extend inward, engaging faces of the upper and lower heads 16 and 17. The slide plates 21 are provided with slots 22 through which pins 23 attached to the heads 16 and 17 extend. This arrangement permits the live electrodes 20 to be moved radially outward from the position shown in the drawings so that they move towards a side wall 24 of the tank 11. Springs 25 are attached to the opposite ends of the live electrodes 20 and to pins 27 attached to the upper and lower heads 16 and 17 for the purpose of resiliently holding the live electrodes in the position shown in the drawings.

Secured to the live electrodes 20 are follower rods 28. These follower rods extend radially inward and are slidably supported by bearings 29 provided by the tie bars 18. Each live electrode 20 is provided with a pair of follower rods 28, one being positioned near each end thereof so that the live electrodes 20 will be translated inward and outward without danger of skewing. Extending into the tank 11 through the tubular support 14 which serves as a bearing is a cam shaft 31. The lower end of the cam shaft 31 is journaled by a bearing 32 supported by the lower head 17. Attached to the cam shaft 31 are cams 34. The upper of the cams 34 is placed so as to operate the upper of the followers 28, and the lower of the cams 34 is adapted to operate the lower of the followers 28. As shown in Fig. 3, the cams 34 are provided with lobes or points 36, each of which provides a cam surface formed of a primary portion 37 and a secondary portion 38. The upper outer end of the cam shaft 31 is provided with a bevel gear 39 which is in mesh with another bevel gear 40 by means of which it is rotated.

Emulsion is introduced into the dehydrating chamber 12 by an emulsion inlet pipe 42 (shown in Fig. 1) situated near the lower part of the tank 11. Oil which has been deemulsified is withdrawn from the upper part of the tank 11 through an oil outlet pipe 43. Water which has been separated from the oil is withdrawn from the tank 11 through a water outlet pipe 44. The tank 11 being grounded, serves as the grounded electrode for the dehydrator. Electric current is supplied to the live electrodes 20 by means of a wire 46 which is attached to the supporting structure and to an insulator bushing 47 secured in the top 13 of the tank 11. The supporting structure is suitably insulated from the tank 11. For instance, the supporting tube 14 and the bevel gear 39 may be formed of insulation material as shown.

The operation of the invention is substantially as follows:

A source of electrical potential such as a transformer 55 is used to impress a potential between the side wall 24 of the tank 11 and the live electrodes 20 in the space 48. Emulsion which is introduced into the dehydrating chamber 12 passes upward through the chamber 12, passing through the space 48, where the high potential electric field is established. The particles of water by the action of the electric field thereon are agglomerated into globules of water which tend to form into short-circuiting chains between the side wall 24 and the live electrodes 20. As previously explained, for reasons of economy and efficiency these chains must be broken immediately after they have formed. During the operation of the dehydrator the cam shaft 31 is rotated by means of the bevel gears 39 and 40 of the upper end of the tank 11. The cams 34 are turned in a direction indicated by an arrow 50 of Fig. 3.

As the cams 34 rotate, the inner ends of the follower rods 28 ride on the primary portions 37 of the points 36 and are therefore forced outward. This moves the live electrodes 20 into positions indicated by dotted lines 51 of Fig. 3. It should be noted that all of the live electrodes are simultaneously moved outward towards the wall 24 of the tank 11 and it should also be noted that they are moved slowly outward. When the cams 34 move so that the primary portions 37 are removed from engagement with the follower rods 28, the springs 25 suddenly return the live electrodes from the positions indicated by dotted lines 51 in Fig. 3 into their original positions as shown in full lines in the drawings. This sudden return of the live electrodes 20 to original position causes the short-circuiting chains of water to be broken, the globules of water forming these chains falling by gravity to the lower part of the tank 11.

The length of time required for the forming of the short-circuiting chains may be determined and the cams 34 may be operated at such a speed that the live electrodes 20 may be suddenly disturbed at intervals which coincide with the intervals of time required for the forming of the short-circuiting chains.

I claim as my invention:

1. An electrical dehydrator comprising: a tank serving as a grounded electrode; means for supplying emulsion into said tank; means for conducting oil from said tank; means for conducting water from said tank; a live electrode in said tank; means for supporting said live electrode in said tank; cam mechanism for slowly moving said live electrode towards the side wall of said tank; and means for suddenly returning said live electrode to its first position.

2. An electrical dehydrator comprising: a tank serving as a grounded electrode; means for supplying emulsion into said tank; means for conducting oil from said tank; means for conducting water from said tank; a live electrode in said tank; follower means secured to said live electrode; supporting structure for slidably supporting said follower means; a shaft extended into said tank; cam means carried by said shaft, said cam means being adapted to operate said follower means in order to slowly move said live electrode towards the side wall of said tank; and means for suddenly returning said live electrode to its first position when said follower means is released by said cam means.

3. An electrical dehydrator comprising: a tank serving as a grounded electrode; means for supplying emulsion into said tank; means for conducting oil from said tank; means for conducting water from said tank; a live electrode in said tank; follower means secured to said live electrode; supporting structure for slidably supporting said follower means; a shaft extended into said tank; cam means carried by said shaft, said cam means being adapted to operate said follower means in order to slowly move said live electrode towards the side wall of said tank; and spring means attached to said live electrode and said supporting structure for suddenly returning said live electrode to its first position when said follower means is released by said cam means.

4. An electrical dehydrator comprising: a tank serving as a grounded electrode; means for supplying emulsion into said tank; means for conducting oil from said tank; means for conducting water from said tank; a supporting structure situated in said tank; a plurality of live electrodes placed in circular arrangement around said supporting structure; slide plates for supporting said live electrodes from said supporting structure, so that said live electrodes may move outward towards the side wall of said tank; cam mechanism for slowly moving said live electrodes towards the side wall of said tank; and means for suddenly returning said live electrodes to their first position.

5. An electrical dehydrator comprising: a tank serving as a grounded electrode; means for supplying emulsion into said tank; means for conducting oil from said tank; means for conducting water from said tank; a supporting structure situated in said tank; a plurality of live electrodes placed in circular arrangement around said supporting structure; slide plates for supporting said live electrode from said supporting structure, so that said live electrodes may move outward towards the side wall of said tank; follower means secured to said live electrodes, said follower means being supported in bearings provided by said supporting structure; a shaft extended into said tank; cam means carried by said shaft, said cam means being arranged to operate said follower means so as to slowly move said live electrodes outward towards the side wall of said tank; and means for suddenly returning said live electrodes to original position when said follower means are released.

6. An electrical dehydrator comprising: a tank serving as a grounded electrode; means for supplying emulsion into said tank; means for conducting oil from said tank; means for conducting water from said tank; a supporting structure situated in said tank; a plurality of live electrodes placed in circular arrangement around said supporting structure; slide plates for supporting said live electrodes from said supporting structure, so that said live electrodes may move outward towards the side wall of said tank; follower means secured to said live electrodes, said follower means being supported in bearings provided by said supporting structure; a shaft extended into said tank; cam means carried by said shaft, said cam means being arranged to operate said follower means so as to slowly and simultaneously move said live electrodes outward towards the side wall of said tank; and means for suddenly returning said live electrodes to original position when said follower means are released.

7. An electrical dehydrator comprising: a treating tank; opposed electrodes providing an intermediate electric field for effecting dehydration of an emulsion; and means for producing a mechanical shock in one of said electrodes to prevent the formation of short-circuiting chains of water globules, said shock being administered at intervals which coincide with the time required for short-circuiting chains to form between said electrodes.

8. In a dehydrator, the combination of: walls forming a treating chamber; opposed electrodes providing a variable-gap treating space in said treating chamber; and means for gradually decreasing said gap to a minimum and quickly increasing said gap to a maximum.

9. A method of electrically treating a fluid which includes the steps of: subjecting said fluid to an electric field of gradually increasing voltage gradient; and suddenly decreasing the gradient of said field to which said fluid is subjected.

10. A method of electrically treating a fluid which includes the steps of: passing said fluid through an electric field formed between two electrodes; and varying the spacing of said electrodes during the passage of said fluid therebetween, said spacing being first gradually decreased and suddenly increased.

11. In a dehydrator, the combination of: a stationary electrode; a movable electrode; and means for successively moving said movable electrode through a cycle comprising a slow motion toward said stationary electrode and a quick motion away therefrom.

12. A combination as defined in claim 11 in which said means maintains said movable electrode parallel to the surface of said stationary electrode during the movement of the former.

13. An electrical dehydrator comprising: a treating tank; an electrode structure in said tank; and means incorporated in said electrode structure and operable from the exterior of said tank for producing a mechanical shock in said electrode structure to prevent the formation of short-circuiting chains.

14. An electrical dehydrator comprising: a treating tank; an electrode structure in said tank; means incorporated in said electrode structure and operable from the exterior of said tank for producing a mechanical shock in said electrode structure to prevent the formation of short-circuiting chains; and means outside of said treating tank for operating the shock-producing means.

15. In combination: a stationary electrode; a movable electrode means; a cam providing one or more lobes, each lobe providing a cam surface resiliently engaging said movable electrode means, said cam surface providing a primary portion formed of gradually increasing radius whereby a rotation of said cam effects a relatively slow movement of said movable electrode means toward said stationary electrode, and providing a secondary portion permitting a relatively quick movement of said movable electrode means away from said stationary electrode means through the resilient engagement of said cam surface and said movable electrode means; and drive means operatively connected to said cam.

In testimony whereof, I have hereunto set my hand at Los Angeles, California, this 30th day of July, 1926.

HAROLD C. EDDY.